May 9, 1967 W. C. ANDERSON ETAL 3,319,185

TEMPERATURE COMPENSATED, FREQUENCY STABILIZED MAGNETIC OSCILLATOR

Original Filed July 17, 1962

INVENTORS
WILMER C. ANDERSON
FRANK P. RENNIE
MICHAEL J. INGENITO by: Stephen Roen ATTY.

United States Patent Office 3,319,185

Patented May 9, 1967

3,319,185

TEMPERATURE COMPENSATED, FREQUENCY STABILIZED MAGNETIC OSCILLATOR

Wilmer C. Anderson, Greenwich, and Frank P. Rennie, Stamford, Conn., and Michael J. Ingenito, Bronx, N.Y., assignors to General Time Corporation, New York, N.Y., a corporation of Delaware Original application July 17, 1962, Ser. No. 210,410, now Patent No. 3,215,951, dated Nov. 2, 1965. Divided and this application Aug. 4, 1965, Ser. No. 508,176

2 Claims. (Cl. 331—113)

This application is a division of applicant's co-pending application 210,410, filed July 17, 1962, entitled, Temperature Compensated Magnetic Oscillator, now U.S. Patent No. 3,215,951, issued Nov. 2, 1965.

The present invention relates to magnetic oscillators and more particularly to means for producing constant frequency in the face of wide temperature changes.

Magnetic oscillators employing transformers having a saturable core and with transistor means to drive the core alternately to positive and negative saturation are known in the art. Use of such devices has been limited to generation of alternating current from a D.-C. source or for other purposes where the frequency need not be precise.

It is an object of the present invention to provide a magnetic oscillator in which the frequency is stably maintained as a precise value in the face of changes in operating conditions. More specifically, it is an object to provide a magnetic oscillator which is capable of maintaining a desired frequency over a wide temperature range. It is another object of the invention to provide an improved magnetic oscillator in which frequency stability is obtained simply and inexpensively employing added components which are commercially available at low cost. Consequently, it is an object to provide a magnetic oscillator which is ideally suited for use in remote equipment or wherever a high degree of reliability is required in the face of difficult operating conditions. Other objects and advantages of the invention will become apparent upon reading the attached detailed description and upon reference to the drawings in which:

FIGURE 1 is an oscillator circuit embodying the present invention.

FIG. 1*a* shows the hysteresis loop characteristic of the transformer in FIG. 1.

FIG. 1*b* shows the change in forward voltage drop of the compensating diodes as a function of temperature.

FIG. 1*c* shows the variation in the resistance of a series "Sensistor" as a function of temperature.

FIG. 1*d* is a fragmentary circuit showing an alternate loading arrangement.

Figures 1, 1A, 1B, 1C, 1D, 2, 3, 4, 5:
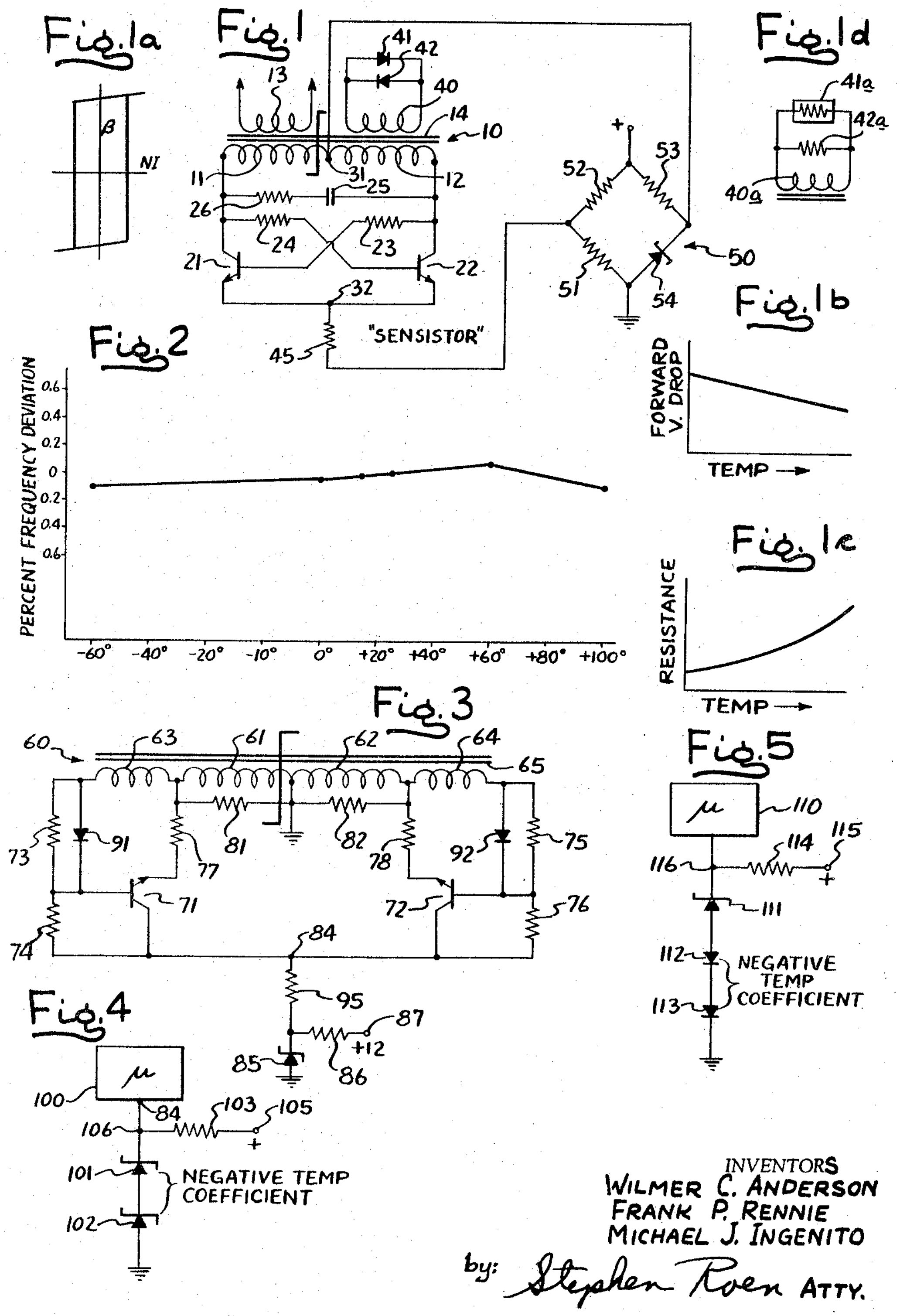
FIG. 2 is a plot of frequency versus temperature for the circuit of FIG. 1 and showing the improvement brought by the present compensating means.
FIG. 3 shows an alternate form of the circuit.
FIGS. 4 and 5 are alternate circuits which may be employed in FIGS. 1 and 2 for reducing the applied voltage upon increase in temperature.

While the invention has been described in connection with certain preferred embodiments, it will be understood that the invention is not limited to the disclosed embodiments but, on the contrary, we intend to cover the various modifications and equivalent arrangements included within the spirit and scope of the appended claims.

Turning now to the drawings, there is set forth in FIG. 1 a schematic diagram of a magnetic oscillator constructed in accordance with the invention utilizing a saturable transformer 10 having a pair of main windings 11, 12 and an output winding 13, all wound about a core 14. The core is formed of a readily saturated magnetic material having a generally rectangular hysteresis loop as in FIG. 1*a*, such material being commercially sold by G.L. Electronics Co. under the name "Orthonik" Type P1040. For driving the core into its opposite conditions of saturation, the windings 11, 12 are energized by transistors 21, 22 having base or input circuits which are alternately energized by feedback or "cross" connections including resistors 23, 24. To improve the wave form a capacitor 25 is connected across the windings 11, 12 with a resistor 26 in series therewith. Using NPN transistors, positive potential is applied to the center terminal 31 of the transformer windings for feeding the collectors, with the emitters being returned to the negative pole via the terminal 32. The transistors are preferably of type 2N696 manufactured by several manufacturers, including Fairchild, Texas Instruments, and others.

The circuit is so polarized that when conduction is initiated in one of the transistors the resulting induced voltage applies forward bias to the base of such transistor causing a regenerative action. When the core saturates, the induced voltage and impedance both diminsh. This results in the collector of the conducting transistor rising in potential and its base current decreasing. This rising collector voltage turns on the former non-conducting transistor and the switching action is completed by the regenerative function mentioned above. The current in the second transistor now drives the core to the opposite conditon of saturation. This cycle is repeated at a rate which is directly proportional to the applied voltage and inversely proportional to the saturation flux and number of turns in the transformer winding. The voltage induced in the output winding 13 as the core switches from a condition of positive to negative saturation and back again constitutes the signal.

In accordance with the present invention a diode having a negative temperature coefficient of resistance in the forward direction is connected to one of the windings of the saturable transformer to provide a variable shunting or loading effect thereby to maintain the frequency constant upon increase in ambient temperature. More specifically, in accordance with the present invention we provide an auxiliary transformer winding shunted by a pair of oppositely facing diodes having a negative temperature coefficient, with the winding being so tailored and the diodes so chosen that little or no circulating current flows at temperatures up to normal ambient temperature but with progressive increase in circulating current as the temperature is increased beyond the normal ambient. Thus referring to FIG. 1 we have provided an auxiliary winding 40 coupled to the core 14 and shunted by oppositely facing diodes 41, 42 respectively. The diodes 41, 42 are preferably of the type manufactured by Silicon Transistor Corp. and referred to as their type STC005, having a forward voltage drop which varies with temperature as set forth in FIG. 1*b*. Moreover, in accordance with one of the aspects of the invention, and to provide compensation at temperatures below normal ambient, we provide, in series with the voltage supply line a resistor having a positive temperature coefficient of resistance. In the present instance this resistor, indicated at 45, takes the form of a device commercially available under the trade name "Sensistor." The "Sensistor" 45 has a resistance which varies with temperature as set forth in FIG. 1*c*. It is found that reliability and stability may be still further improved by close-coupling the resistor 45 to the transformer core. To accomplish this the resistor 45 is preferably made in the form of wire having a positive coefficient wound about the core in a bifilar, or non-inductive, winding. A wire suitable for this purpose is sold under the trade name "Balco" by the Wilbur Driver Company.

It may be shown that in a core 14 formed of "Orthonik" material the flux at saturation is not constant upon changes in temperature. The saturation flux, remains relatively constant for temperatures up to normal room temperature but beyond this point the saturation flux progressively decreases. Since the oscillation frequency is inversely proportional to the saturation flux, an increase in frequency with temperature is normally experienced. However, when employing the auxiliary winding 40 and diodes 41, 42 any increase in temperature beyond normal ambient temperature produces a progressive increase in circulating current which has a loading effect upon the transformer. It is found that such loading effect is the equivalent to making a progressive reduction in the applied voltage. Since the oscillating frequency is directly proportional to applied voltage, it is found that the loading effect from normal ambient to a temperature of approximately 100%, tends to balance out the effect of the higher temperature upon the core material. It is found that the loading effect of the diodes 41, 42 acts to compensate with a high degree of precision for the effect of the higher temperatures upon the core material. In a practical case, as indicated in FIG. 2, it is possible, using the present teachings, to maintain the frequency of a magnetic oscillator constant to better than 0.1% over a temperature range from, say, 20° C. to 100° C. A conventional magnetic oscillator, by comparison, may vary in frequency, from minus 3 to plus 6 percent or more over the same temperature range.

It will be apparent, then, that we have provided a novel temperature compensation arrangement employing loading by diodes having a negative temperature coefficient and voltage dropping by a resistor having a positive temperature coefficient, the net effect of which is to maintain the frequency of oscillation constant over a wide temperature swing. This makes it possible to use the oscillator for numerous purposes where a substantially constant frequency is desired combined with susceptibility to miniaturized construction in remote equipment or in apparatus requiring the highest order of reliability.

Moreover, in order to make the oscillator substantially immune to minor changes in the voltage of the supply, we prefer to employ between the voltage source and the oscillator a bridge circuit generally indicated at 50 and having resistors 51–53 in three legs and a zener diode 54 in the fourth leg. Bridges of this type are, per se, known to those skilled in the art and may be referred to as a "zener bridge." It will suffice to say that such a bridge enables closer control of voltage than is possible using the zener alone. As a result the frequency remains substantially constant in the face of variations in the supply which may, for example, be brought about by the gradual exhaustion of supply batteries when the device is employed in remote locations as, for example, on satellites or the like.

While the invention has been discussed above in connection with oppositely connected diodes for loading transformer winding 40, the invention is not limited thereto but includes other auxiliary load means in which the loading effect increases upon increase in temperature to the extent necessary to effect compensation for the effect of temperature upon the core material and associated transistors. Thus as shown in FIG. 1*d*, the auxiliary winding, here indicated at **40*a* has a shunt load in the form of a thermistor 41*a* having a negative temperature coefficient of resistance, i.e., a negative coefficient of forward drop. In order to tailor or vary the effect of the thermistor, the thermistor preferably is shunted by a conventional resistor 42*a*. It will be apparent, also, to one skilled in the art that the magnitude of the thermistor effect may be varied by varying a series resistor in the thermistor leg. The precise value of the resistors 41*a*, 42*a* depends upon the degree of compensation desired which in turn depends upon the particular characteristics of the core material and the transistors employed. In a practical case, compensation has been brought about by using a thermsitor having a resistance of 1000 ohms at normal ambient temperature and a nominal negative temperature coefficient of 4.4% shunted by a resistor 42*a*** of 1000 ohms.

The invention is not limited to the embodiment described above but includes use of diodes having a negative temperature coefficient of resistance connected to other windings of the saturable transformer for frequency stabilization purposes. Thus referring to FIG. 3, there is provided a saturable transformer 60 having windings 61, 62, 63, 64. The windings 61, 62 correspond to the windings 11, 12 in the previous version; the windings 63, 64 constitute auxiliary windings employed to excite the base or input terminals of the transistors. The transformer has a core 65, as before, formed of magnetic material which is easily saturated and which is characterized by a generally rectangular hysteresis loop. The transistors indicated at 71, 72 may be of the same type as transistors 21, 22 of the previous embodiment. For energizing the base or input terminal of the transistor 71 it is connected to the central point of a voltage divider formed of resistors 73, 74. Corresponding resistors 75, 76 are associated with the base of the transistor 72. Proper proportioning of the resistors determines the bias on the transistor base and determines the region of the transistor characteristic over which operation takes place. Stabilization is provided by low value degeneration resistors 77, 78 in the emitter circuits while damping is provided by shunting resistors 81, 82 across the transformer windings 61, 62 respectively. For maintaining the voltage applied to the collector terminal 84 substantially constant in the face of changes in the supply, a zener 85 is employed, shunted to ground, and a dropping resistor 86 is provided in series with the supply terminal, indicated at 87.

In the operation of the circuit described above, application of voltage causes both of the transistors to tend to conduct but because of slight inherent unbalance in the circuit one will normally tend to conduct more heavily than the other. Conduction in the predominating transistor induces a voltage in the associated control winding which is in such a direction as to bias such transistor in the forward direction so that the predominating transistor tends to conduct more heavily while the remaining transistor tends to become non-conductive. When saturation is reached, the rate of change of flux decreases, hence the induced voltage decreases. By transformer action the bias voltage on the conducting transistor also diminishes, hence the current in this transistor decreases so that the transistor becomes non-conducting. The decaying current induces a voltage across the bias winding of the "off" transistor in the direction to turn it on. The conduction is in a direction to increase the induced forward bias so that the second transistor conducts current heavily to drive the core into the condition of opposite, or negative, saturation. When saturation is reached, and slightly exceeded, the resulting reduction in current reduces the bias of the then conducting transistor but increases the forward bias on the opposite transistor so that the core is driven back to a condition of positive saturation. This oscillation continues, first one of the transistors conducting and then the other, at a frequency which is, as in the earlier embodiment, determined by the transformer geometry and the applied voltage.

In carrying out the present invention diodes having a negative temperature coefficient of resistance are connected to the windings 63, 64 which control the base circuits of the transistors 71, 72 respectively. Such diodes, indicated at 91, 92 are, in the present circuit, effectively in parallell with the resistors 73, 75 previously referred to. Each diode, during the conductive portion of the cycle, acts to reduce the resistance in the associated control circuit consisting of the control winding and the base-emitter junction of the transistor. However, the effect at all temperatures is not the same. Thus, there will be a lower effective resistance, and hence greater conductivity, the higher the temperature. The windings 63, 64 being heavily shunted thus tend to oppose any sudden change or collapse of flux and hence tend to increase the pulse width. Moreover, the increase in current flow in the control windings, in other words the increase in loading effect, is mirrored in the amount of current flowing in the main transformer windings. The net effect is to compensate for the tendency of the circuit to increase in frequency upon increase in temperature, as regards the temperature characteristics of the core material. It is found that the circuit shown in FIG. 3 is capable of maintaining a constant frequency to almost the same degree as the circuit of FIG. 1. If desired, a series resistor 95 may be interposed in the supply leg corresponding to the resistor 45 in FIG. 1.

By way of example and to assist in putting the present invention to use, it will be helpful to specify the circuit constants which have been employed in a practical case. Thus in both FIGS. 1 and 3 the core may consist of a ribbon formed of Orthonik approximately ¼" in width and 0.00025" in thickness wound about a ¼" bobbin to a total number of 22 turns. For a frequency of 10K cycles per second, the windings 11, 12 in FIG. 1 may be formed of 105 turns of #33 wire. The output winding 13 may be formed of 55 turns and the auxiliary winding 40 of 10 turns. In the case of the embodiment shown in FIG. 3 the main windings 61, 62 may be formed of 105 turns of #38 wire and the windings 63, 64 of 33 turns. For frequency adjustment, a slightly larger number of turns may be employed with the turns being successively removed one by one on the main windings until the desired frequency is achieved. The remaining circuit constants in the preferred embodiments, FIGS. 1 and 3, are as follows:

| | |
|---|---|
| **21, 22** | Transistors Type 2N717. |
| **23, 24** | 3.9K ohms. |
| **25** | 470 micromicrofarads. |
| **26** | 680 ohms. |
| **41, 42** | STC005. |
| **45** | 68 ohm Sensistor. |
| **51** | 47 ohms. |
| **52** | 1.8K ohms. |
| **53** | 220 ohms. |
| **54** | IN825A. |
| **71, 72** | Transistors Type 2N717. |
| **73, 75** | 1000 ohms. |
| **74, 76** | 8200 ohms. |
| **77, 78** | 4.7 ohms. |
| **81, 82** | 4700 ohms. |
| **85** | Diode Type IN825A. |
| **86** | 270 ohms–330 ohms. |
| **91, 92** | Diodes Type STC005. |

For lower frequencies, a correspondingly greater number of turns and larger cores may be used.

While temperature compensation is effected, in part, in FIG. 1 by use of a series resistor 45 having a positive temperature coefficient of resistance, it will be understood that the invention is not limited thereto but includes use of control elements in a parallel leg of the circuit and having a negative coefficient of resistance to bring about the same result. For example, referring to FIG. 4, there are provided, in parallel with the oscillator circuit 100, one or more zener diodes 101, 102 having a negative coefficient of resistance, as, for example Type IN747.

Current is supplied to the parallel circuit via a dropping resistor 103 fed by a terminal 105 from a battery or similar source. In operation an increase in temperature acts to lower the point of the zener conduction. This lowers the voltage maintained at the input terminal 106 of the oscillator 100. Such lower voltage has the effect of reducing the frequency thereby to compensate for the decrease in saturation flux in the core of the saturable transformer which, uncompensated, would tend to produce increase in frequency of oscillation. It may be necessary to employ more than one of the zener diodes in series since such diodes are currently available only in relatively low voltage ratings.

The same regulatory effect can be achieved by the arrangement shown in FIG. 5. Here the oscillator indicated generally at 110 has a parallel circuit which consists of a zener diode 111 in series with non-zener diodes having a negative temperature coefficient and indicated at 112, 113. The zener diode may be of Type IN825A and the remaining diodes of Type STC005. Current is supplied to the parallel circuit by a dropping resistor 114 from a source 115. The reduction in voltage drop across the diodes 112, 113 which tends to occur at higher temperatures reduces the voltage maintained at terminal 116. As stated above, this compensates for the effect of temperature upon the core material with the result that the frequency is maintained more nearly constant.

Stability has been achieved by use of auxiliary circuit components which are inexpensive and readily available. Constant frequency is maintained in spite of shock and vibration and the resistance to environmental changes may be further reduced by "potting." Since all of the components are inherently small, the circuits are ideally suited to miniaturization as building blocks in more complex apparatus, wherever a stable oscillator is required. The frequency may be varied over wide limits simply by varying the number of turns and size of core in the transformer.

We claim as our invention:

1. In a saturable core magnetic oscillator comprising a saturable transformer having a saturable core formed of material characterized by a generally rectangular hysteresis characteristic as well as by a reduction in permeability upon increase in ambient temperature, said transformer having a pair of saturating windings and a pair of triggering windings, a source of voltage, first and second switches interposed between the voltage source and the transformer windings, each of said switches having an input circuit and an output circuit connected to the triggering and saturating windings respectively so that the core is driven alternatively between its positive and negative conditions of saturation at a regular oscillatory rate, means for stabilizing the frequency of said oscillator under varying temperature conditions, said means comprising first and second diodes interposed in the input circuits of the respective switches and of the type having a forward voltage drop which decreases substantially linearly with increase in ambient temperature thereby to increase the load upon the respective triggering windings progressively at elevated temperatures for maintaining a substantially constant frequency of oscillation over a temperature range.

2. In a saturable core magnetic oscillator comprising a saturable transformer having a saturable core formed of material characterized by a generally rectangular hysteresis characteristic as well as by a reduction in permeability upon increase in ambient temperature, said transformer having a pair of saturating windings and a pair of triggering windings, a source of voltage, first and second transistors interposed between the voltage source and the transformer windings, said transistors having their base and collector circuits connected to the triggering and saturating windings respectively so that the core is driven alternatively between its positive and negative conditions of saturation at a regular oscillatory rate, means for stabilizing the frequency of said oscillator under varying temperature conditions, said means comprising first and second diodes interposed in the base circuits of the respective transistors and of the type having a forward voltage drop which decreases with increase in ambient temperature, and degenerating resistors in series with the emitters of the respective transistors for maintaining a substantially constant frequency of oscillation over a temperature range.

References Cited by the Examiner

UNITED STATES PATENTS 2,875,351 2/1959 Collins ------------- 331—113

ROY LAKE, *Primary Examiner.*

J. KOMINSKI, *Examiner.*